(12) United States Patent
Scofield (10) Patent No.: US 12,078,842 B2
(45) Date of Patent: Sep. 3, 2024

(54) OPTICAL MULTIPLEXER

(71) Applicant: ROCKLEY PHOTONICS LIMITED, Altrincham (GB)

(72) Inventor: Adam Scofield, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 80 days.

(21) Appl. No.: 17/755,969

(22) PCT Filed: Nov. 12, 2020

(86) PCT No.: PCT/EP2020/081964
§ 371 (c)(1),
(2) Date: May 12, 2022

(87) PCT Pub. No.: WO2021/094486
PCT Pub. Date: May 20, 2021

(65) Prior Publication Data
US 2022/0381981 A1    Dec. 1, 2022

Related U.S. Application Data

(60) Provisional application No. 62/935,562, filed on Nov. 14, 2019.

(51) Int. Cl.
*G02B 6/12*    (2006.01)
(52) U.S. Cl.
CPC ..... *G02B 6/12016* (2013.01); *G02B 6/12007* (2013.01); *G02B 6/12009* (2013.01); *G02B 6/12014* (2013.01)
(58) Field of Classification Search
None
See application file for complete search history.

(56) References Cited

U.S. PATENT DOCUMENTS

| 5,675,675 A | 10/1997 | Trouchet |
| 6,058,233 A | 5/2000 | Dragone |

(Continued)

FOREIGN PATENT DOCUMENTS

| CN | 1171559 A | 1/1998 |
| CN | 1492617 A | 4/2004 |

(Continued)

OTHER PUBLICATIONS

Feng, D. et al., "Fabrication Insensitive Echelle Grating in Silicon-on-Insulator Platform", IEEE Photonics Technology Letters, Dec. 23, 2010, pp. 284-286, vol. 23, No. 5, IEEE.

(Continued)

*Primary Examiner* — Jerry Rahll
(74) *Attorney, Agent, or Firm* — Lewis Roca Rothgerber Christie LLP (57) ABSTRACT

An optical multiplexer. The optical multiplexer comprising: a plurality of input waveguides, each comprising an input slab portion and an input rib portion; an output waveguide, comprising an output slab portion and output rib portion; and a wavelength multiplexer element, coupled to each input waveguide and the output waveguide, the wavelength multiplexer element comprising a slab waveguide which includes a grating configured to multiplex signals of differing wavelengths, received from the input waveguides, into a multiplexed signal, and provide the multiplexed signal to the output waveguide. The input rib portion(s) of one or more of the input waveguides are tapered so as to decrease in width in a direction towards the slab waveguide of the wavelength multiplexer element which is an echelle grating or an arrayed waveguide grating.

19 Claims, 13 Drawing Sheets

(56) References Cited

U.S. PATENT DOCUMENTS

| | | |
|---|---|---|
| 2003/0118284 A1 | 6/2003 | Ide |
| 2004/0264863 A1 | 12/2004 | Suzuki et al. |
| 2009/0154880 A1* | 6/2009 | Song .................. G02B 6/12011 385/46 |
| 2018/0095224 A1 | 4/2018 | Luo et al. |
| 2019/0041578 A1* | 2/2019 | Mahgerefteh ...... G02B 6/12016 |

FOREIGN PATENT DOCUMENTS

| | | |
|---|---|---|
| EP | 0 816 877 A1 | 1/1998 |
| JP | 2004-170627 A | 6/2004 |
| JP | 2005/326561 A | 11/2005 |
| KR | 10-2015-0032145 A | 3/2015 |
| WO | WO 2013/010058 A1 | 1/2013 |

OTHER PUBLICATIONS

International Search Report and Written Opinion of the International Searching Authority, mailed Feb. 10, 2021, corresponding to PCT/EP2020/081964, 11 pages.

Luff, B. J. et al., "Hybrid Silicon Photonics for Low-Cost High-Bandwidth Link Applications", Advances in Optical Technologies, Apr. 2008, pp. 1-6, vol. 2008, Article ID 245131, Hindawi Publishing Corporation.

Melati, D. et al., "Compact and Low Crosstalk Echelle Grating Demultiplexer on Silicon-On-Insulator Technology" Electronics, Jun. 18, 2019, pp. 1-7, vol. 8, No. 687, MDPI.

U.K. Intellectual Property Office Search and Examination Report, dated Apr. 23, 2021, for Patent Application No. GB2017864.6, 8 pages.

U.K. Intellectual Property Office Examination Report, dated Feb. 10, 2022, for Patent Application No. GB2017864.6, 6 pages.

International Search Report of PCT/EP2020/081964, Feb. 10, 2021, 3 pages.

Chinese Notification of the First Office Action, for Patent Application No. 202080093121.9, mailed Nov. 14, 2023, 7 pages.

Partial English translation of the Chinese Notification of the First Office Action, for Patent Application No. 202080093121.9, mailed Nov. 14, 2023, 6 pages.

Chinese Notification of the Second Office Action, for Patent Application No. 202080093121.9, mailed Jun. 13, 2024, 6 pages.

Partial English translation of the Chinese Notification of the Second Office Action, for Patent Application No. 202080093121.9, mailed Jun. 13, 2024, 6 pages.

* cited by examiner

OPTICAL MULTIPLEXER

CROSS-REFERENCE TO RELATED APPLICATION(S)

This application is a U.S. national stage entry, under 35 U.S.C. § 371, of International Application Number PCT/EP2020/081964, filed on Nov. 12, 2020, which claims priority to and the benefit of U.S. Provisional Application No. 62/935,562, filed Nov. 14, 2019. The entire contents of all of the applications identified in this paragraph are incorporated herein by reference.

FIELD OF THE INVENTION

The present invention relates to an optical multiplexer.

BACKGROUND

A significant problem in the design of multiplexers, and particularly Echelle grating multiplexers, is that it would be desirable to have a broader channel bandwidth. This would reduce losses caused by alignment error and temperature drift, as channel crosstalk is not significant. However, conventional approaches to broaden the channel bandwidth come at a cost of reduced transmission.

Figure 1:
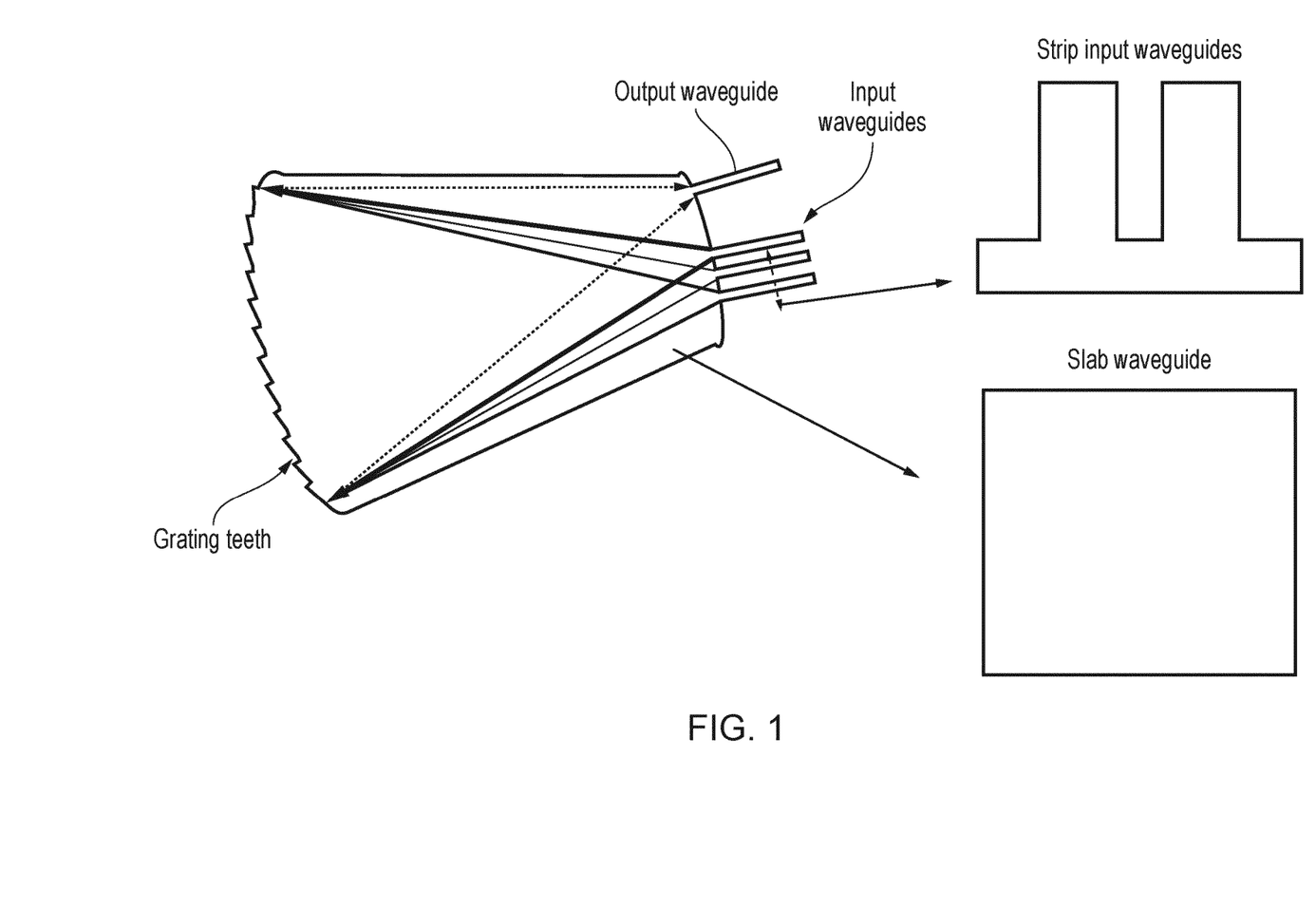
FIG. 1 shows an Echelle grating based multiplexer.

For example, in an Echelle grating multiplexer with optimum transmission the input and output waveguides are strip waveguides. This shown in FIG. 1. The strip waveguides have an optical mode centre which is physically centre in the vertical direction. This maximises coupling to the slab region of the Echelle grating whose optical mode centre is also physically centre in the vertical direction.

Figure 2A:
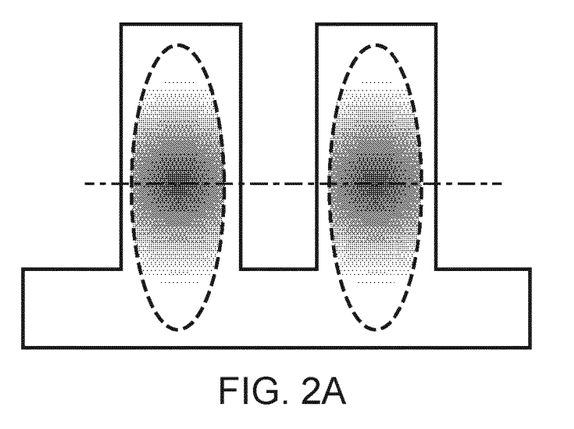
FIG. 2A-2C each shows an optical mode in a region of the Echelle grating of FIG. 1.
Figure 2B:
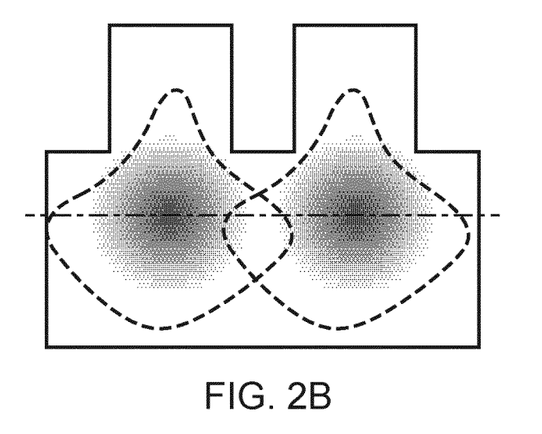
Figure 2C:
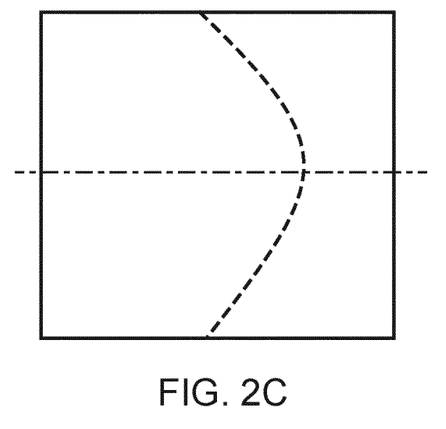
Figure 3:
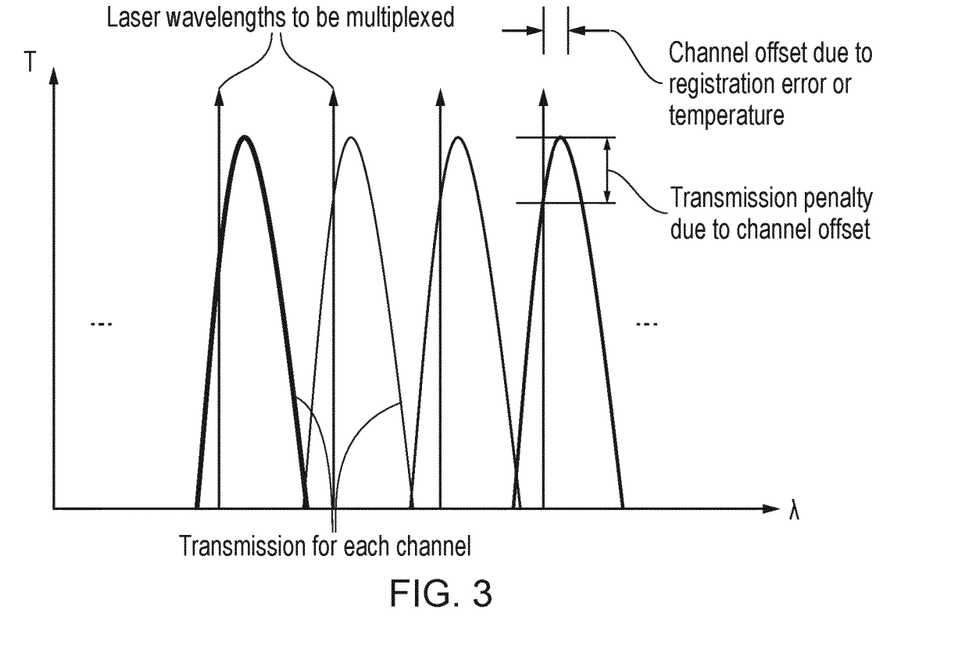
FIG. 3 is a plot of wavelength against transmission where the input waveguides in the multiplexer of FIG. 1 are different in width to the output waveguide(s)
Figure 4:
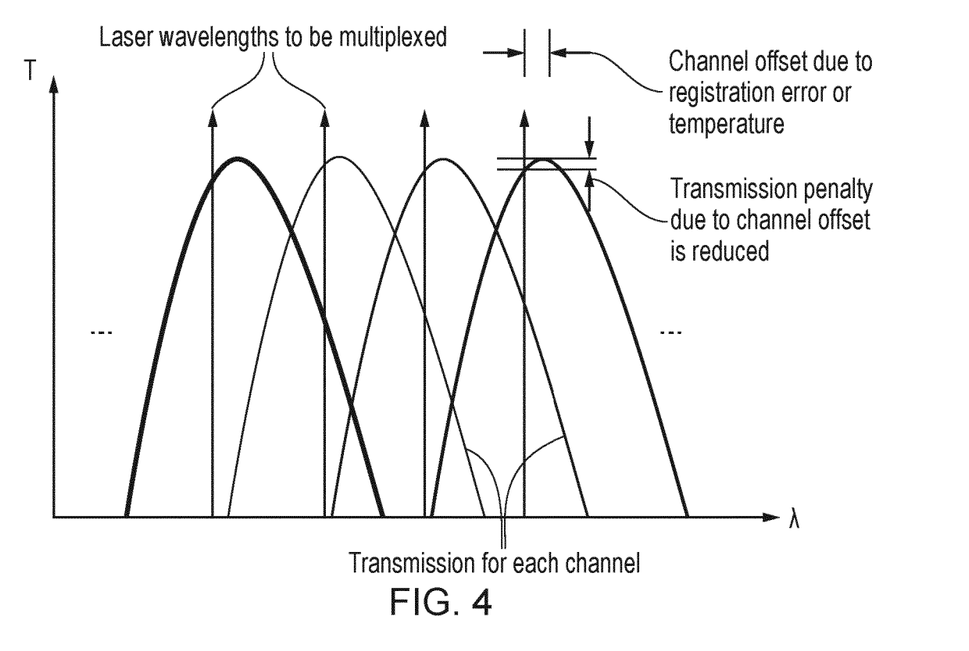
FIG. 4 is a plot of wavelength against transmission where rib waveguides are provided in the multiplexer of FIG. 1.

There are two common approaches taken to broaden the channel bandwidth: (1) make the input waveguides a different width than the output waveguides; and (2) use rib waveguides such that the mode extends into the surrounding rib etched region. This is shown in FIGS. 2A-2C. An issue with the first approach is that by making the input mode width different than the output mode width, the mismatch reduces the peak transmission and there is no overall benefit in performance (shown in FIG. 3). A problem with the second approach is that the rib waveguides have a mode centre which is not physically centre in the vertical direction, and this also reduces the peak transmission and so again no overall benefit in performance is seen (shown in FIG. 4).

It is desirous then to increase the channel bandwidth of a multiplexer whilst not incurring additional losses.

SUMMARY

Accordingly, in a first aspect, embodiments of the present invention provide an optical multiplexer, comprising:
a plurality of input waveguides, each comprising an input slab portion and an input rib portion;
an output waveguide, comprising an output slab portion and output rib portion; and
a wavelength multiplexer element, coupled to each input waveguide and the output waveguide, the wavelength multiplexer element comprising a slab waveguide which includes a grating configured to multiplex signals of differing wavelengths, received from the input waveguides, into a multiplexed signal, and provide the multiplexed signal to the output waveguide;
wherein the input rib portion(s) of one or more of the input waveguides are tapered so as to decrease in width in a direction towards the slab waveguide of the wavelength multiplexer element.

The tapered width of the input rib portion(s) broaden the optical mode width significantly, and so the channels of the multiplexer are correspondingly broader in the spectral domain as well.

The optical multiplexer may have any one or, to the extent that they are compatible, any combination of the following optional features.

All of the input waveguides may be tapered, i.e. all of their input rib portions may be tapered, so as to decrease in width in a direction towards the slab waveguide of the wavelength multiplier element.

As will be readily understood, the multiplexer may function as a demultiplexer as the device is optically symmetric (per the Helmholtz reciprocity principle).

The output waveguide may be tapered, e.g. the output rib portion may be tapered, so as to decrease in width in a direction towards the slab waveguide of the waveguide multiplexer element. The output waveguide may have the same geometry as the or each input waveguide.

The or each input waveguide may be tapered, i.e. the or each input rib portion may be tapered, so that an optical mode within the or each input waveguide is confined to the slab portion of that input waveguide at a point at which that input waveguide is coupled to the slab waveguide of the wavelength multiplexer element.

The input slab portions of the input waveguide and/or the output slab portion of the output waveguide may have a height which is substantially equal to a height of the slab waveguide in the wavelength multiplexer element.

The wavelength multiplexer element may be a grating wavelength multiplexer element. The wavelength multiplexer element may be an echelle grating multiplexer element. The wavelength multiplexer element maybe an arrayed-waveguide grating multiplexer element.

An optical mode of each input waveguide may at least partially overlap the optical mode of the adjacent input waveguide(s).

The wavelength multiplexer element may be configured to perform coarse wavelength division multiplexing.

The optical multiplexer may be operable over a wavelength range of at least 1.2 μm.

The optical multiplexer may form a part of a spectrometer (for example a Ramen spectrometer) or other imaging device. The spectrometer or imaging device may be located on a photonic integrated chip. For example, it may be located in a silicon on insulator platform. The multiplexer may be downstream of a laser, e.g. a pump Distributed Bragg Reflector laser, and upstream of one or more lenses.

The invention includes the combination of the aspects and preferred features described except where such a combination is clearly impermissible or expressly avoided.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 5:
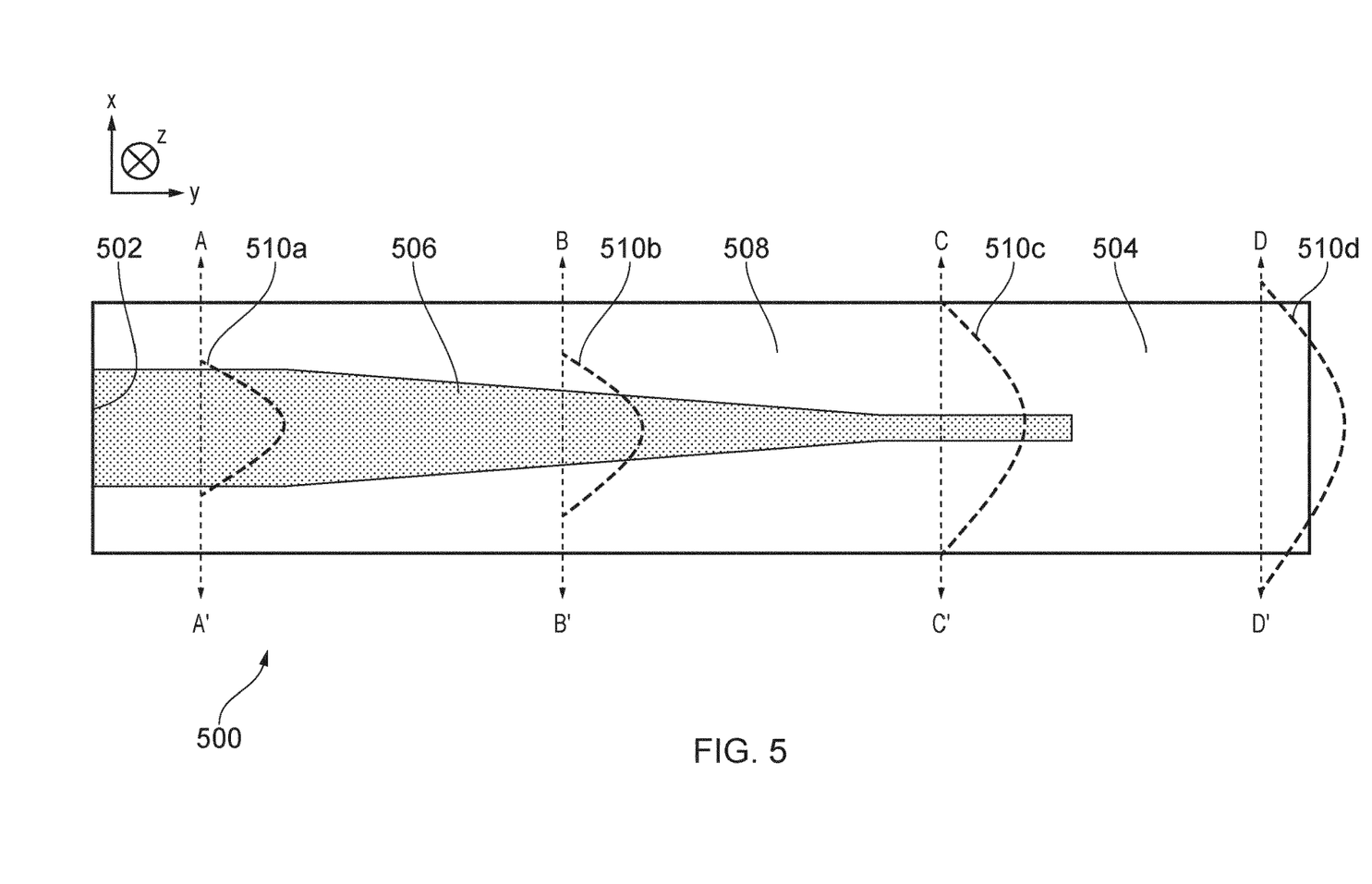
FIG. 5 is a top-down view of an input waveguide according to an embodiment of the present invention
Figure 6A:
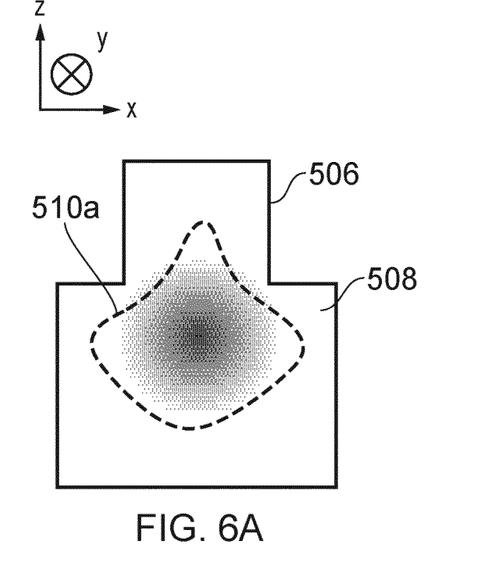
FIGS. 6A-6D show cross-sectional views along points of the input waveguide of FIG. 5.
Figure 6B:
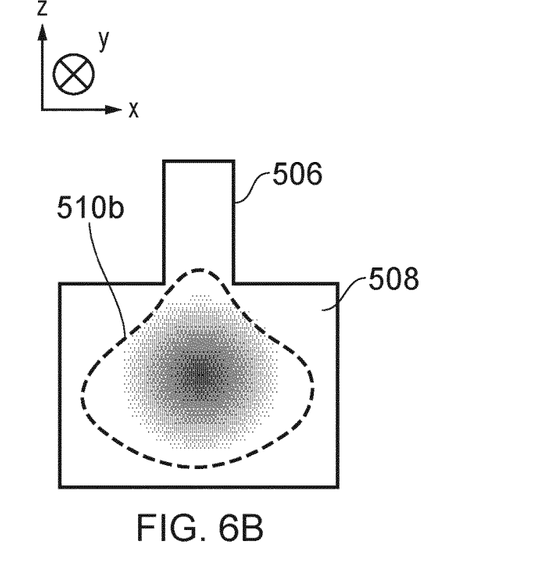
Figure 6C:
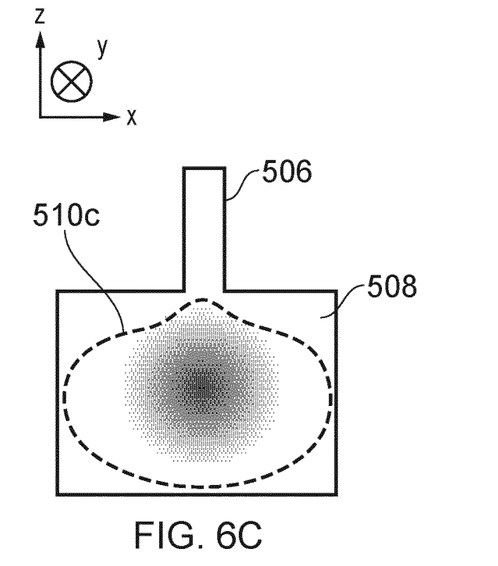
Figure 6D:
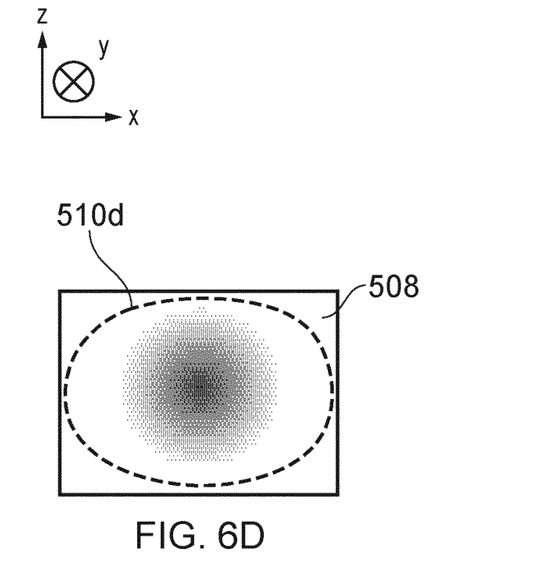

FIG. 5 is a top-down view of an input waveguide 500, used in an optical multiplexer according to an embodiment of the present invention. The input waveguide 500 has an input facet 502, and is connected to a slab waveguide 504 of a wavelength multiplexer element of the type discussed below with reference to FIG. 9A. The input waveguide 500 comprises an input rib portion 506 and an input slab portion 508, the rib portion extending from the slab portion in a vertical direction (the z axis in FIG. 5, where the y axis is along a guiding direction of the waveguide). The input rib portion 506 of the input waveguide is tapered, and so decreases in width (as measured in the x axis) in a direction towards the slab waveguide 504 of the wavelength multiplexer element. As is shown by dashed lines 510a-510d, the optical mode of light traversing the input waveguide 500 broadens as the light passes from the input facet 502 to the slab waveguide 504. The optical mode is pushed into the input slab portion 508 as the input rib portion 506 becomes narrower, which causes the optical mode to expand.

FIGS. 6A-6D show cross-sectional views along the lines A-A', B-B', C-C', and D-D' shown in FIG. 5 respectively. As can be seen, the portion of optical mode 510a-510c located within the input rib portion 506 is squeezed in the x direction (generally perpendicular to the guiding direction, y, of the waveguide) as the input rib portion 506 narrows. Eventually, the entire optical mode 510d is contained within the input slab region 508 and is wider than the initial optical mode 510a shown in FIG. 6A.

Whilst FIGS. 5 and 6A-6D show an input waveguide, in which light is received in an input facet and provided to a slab waveguide 504 of a wavelength multiplexer element, an output waveguide in some examples of the multiplexer has substantially the same geometry as the input waveguide. In such an example, the light is coupled from the slab waveguide 504 into an output rib and slab portion, before exiting the output waveguide at an output facet. Accordingly, the optical mode of light within the output waveguide is pushed up into the output rib portion, and so narrows in comparison to the mode within the slab waveguide 504.

Figure 7:
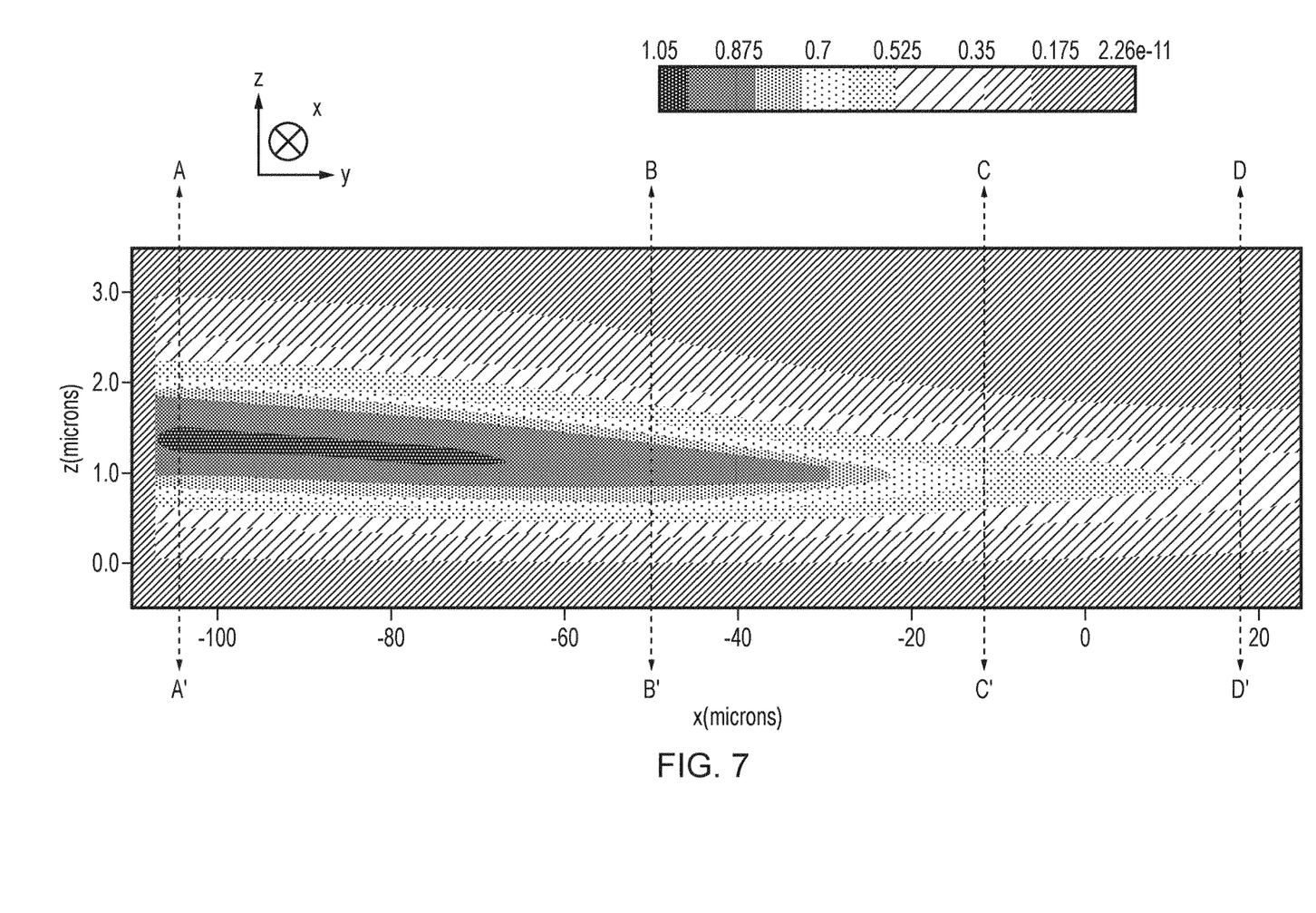
FIG. 7 shows a simulation of an electric field density along a cross-section of the input waveguide of FIG. 5.
Figure 8A:
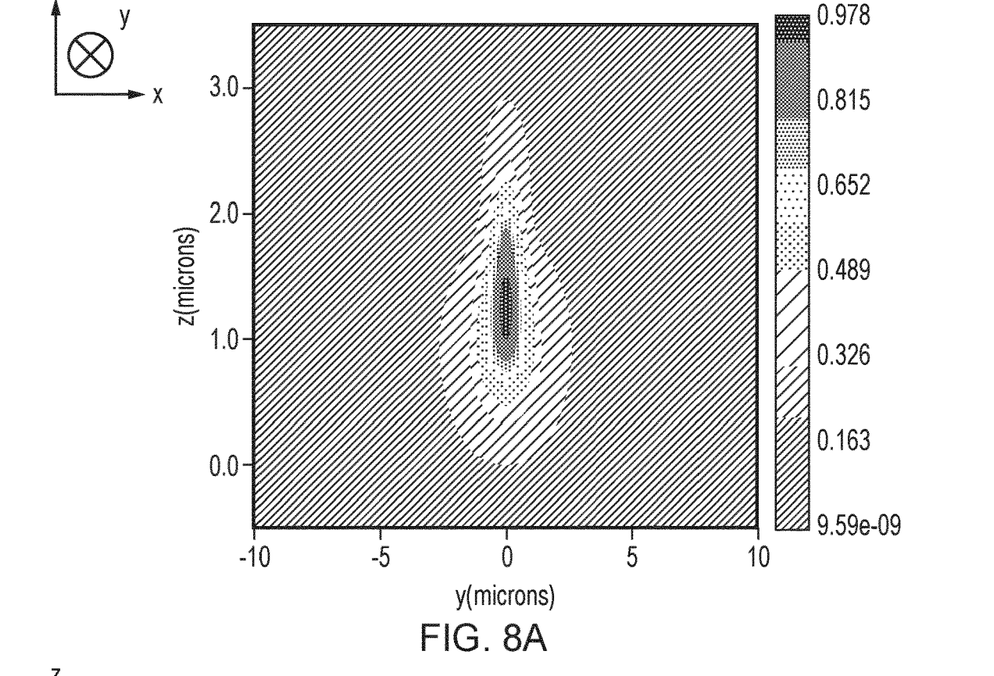
FIGS. 8A-8D show electric field densities along cross-sectional views of the input waveguide of FIG. 5.
Figure 8B:
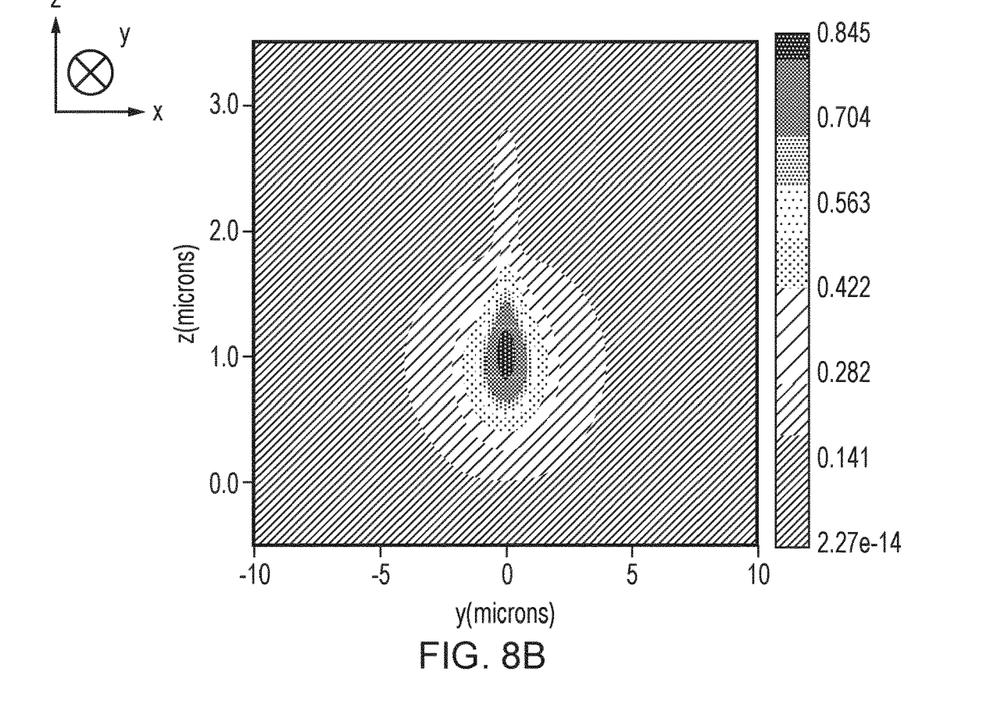
Figure 8C:
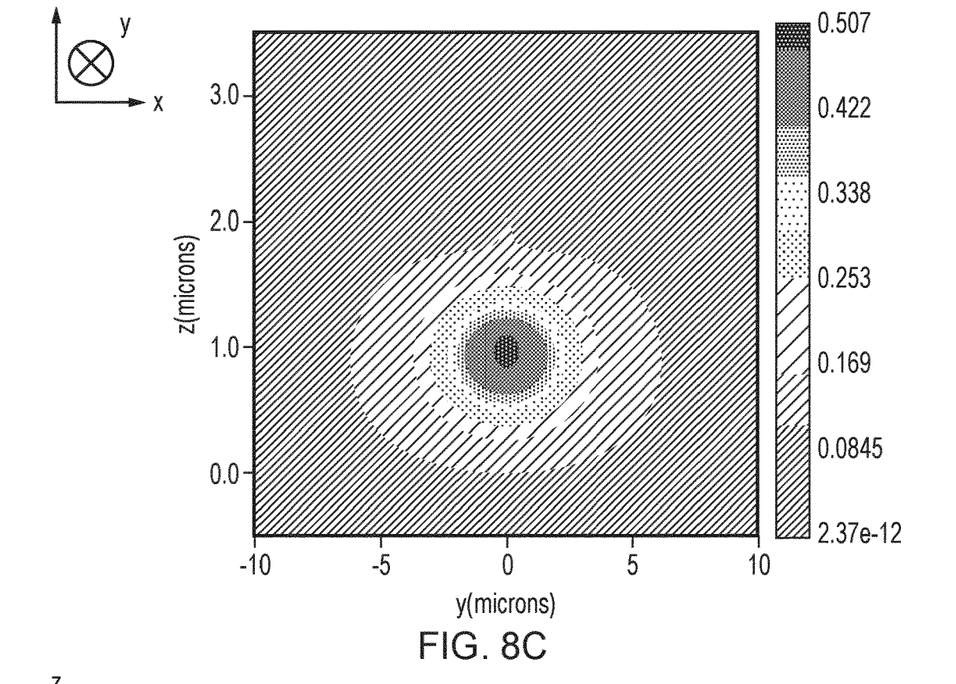
Figure 8D:
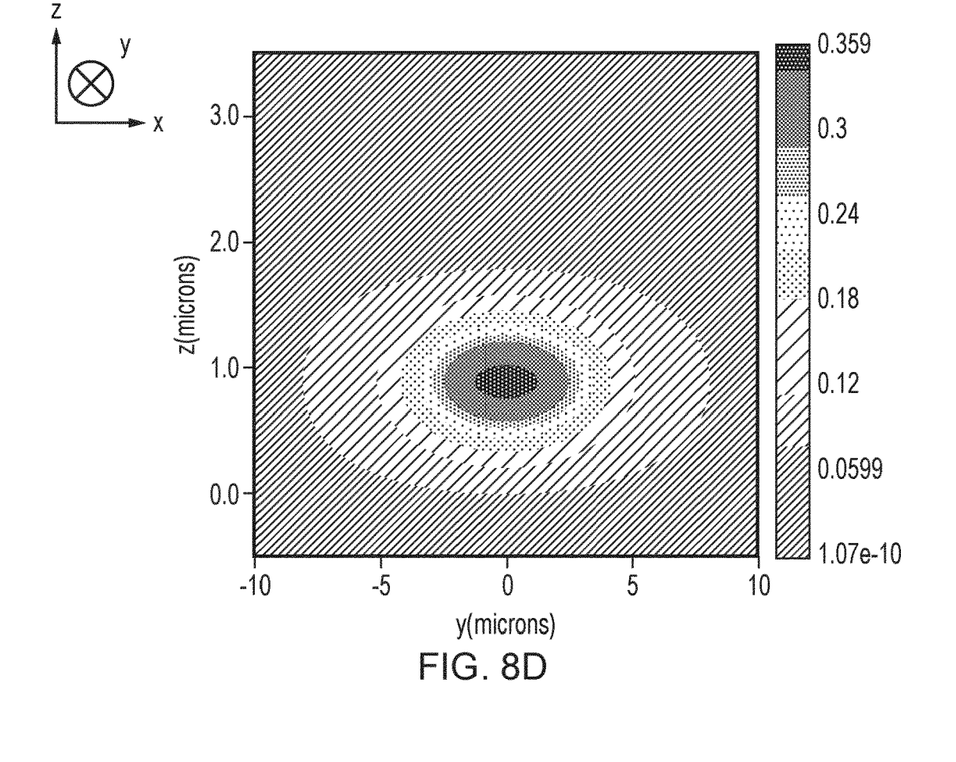

FIG. 7 shows a simulation of an electric field density along a cross-section of the input waveguide of FIG. 5. As can be seen, as light travels from left to right, it is pushed down into the lower input slab portion. FIGS. 8A-8D show electric field densities along cross-sectional views of the input waveguide of FIG. 5 along the lines A-A', B-B', C-C', and D-D' respectively.

Figure 9A:
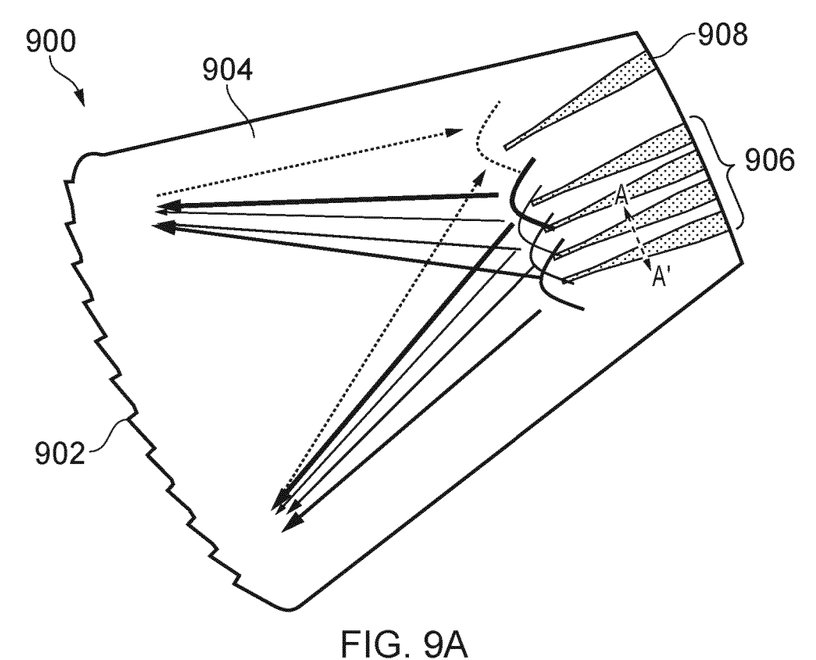
FIG. 9A shows an optical multiplexer.

FIG. 9A shows an optical multiplexer 900 according to an embodiment of the present invention. The optical multiplexer 900 includes a wavelength multiplexer element 902 provided as an echelle grating with a plurality of teeth. The wavelength multiplexer element 902 is coupled, via a slab waveguide 904, to a plurality of input waveguides 906 of the type shown in FIG. 5, and an output waveguide 908 which in this example has the same geometry as the input waveguides.

In use, a plurality of optical signals enter the optical multiplexer via input waveguides 906. These signals are separated in wavelength, and are multiplexed via wavelength multiplexer element 902. The multiplexed signal, now comprising the combination of the separate signals, is provided through output waveguide 908 for transmission. Of course, it will be understood that the system is symmetric and so the multiplexer may function as a demultiplexer when a multiplexed signal is coupled from the output waveguide 908 into the slab waveguide 904 of the wavelength multiplexer element.

Figure 9B:
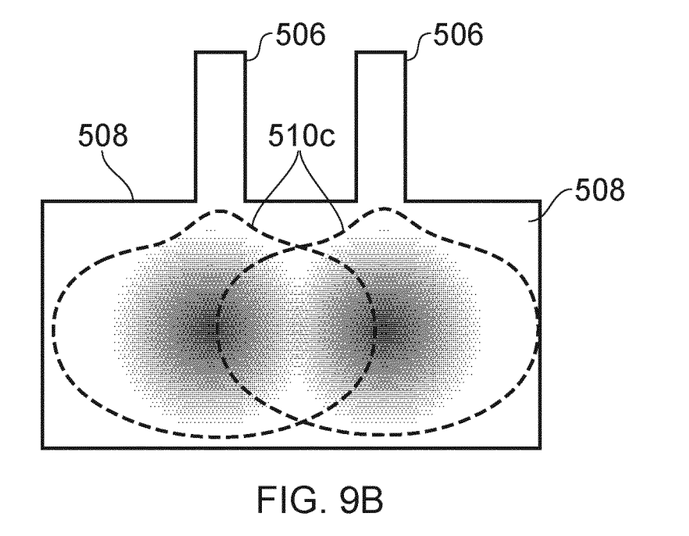
FIG. 9B shows a cross-sectional view of a portion of the optical grating multiplexer of FIG. 9A.

FIG. 9B shows a cross-sectional view of the optical multiplexer 900 of FIG. 9A along the line A-A'. As can be seen, at this point the input rib portions 506 have tapered sufficiently so as to push the optical modes 510c of light contained therein substantially into the input slab portions 508. Conveniently, substantial overlap is seen between the modes due in part to the proximity of the input rib portions 506.

Figure 10A:
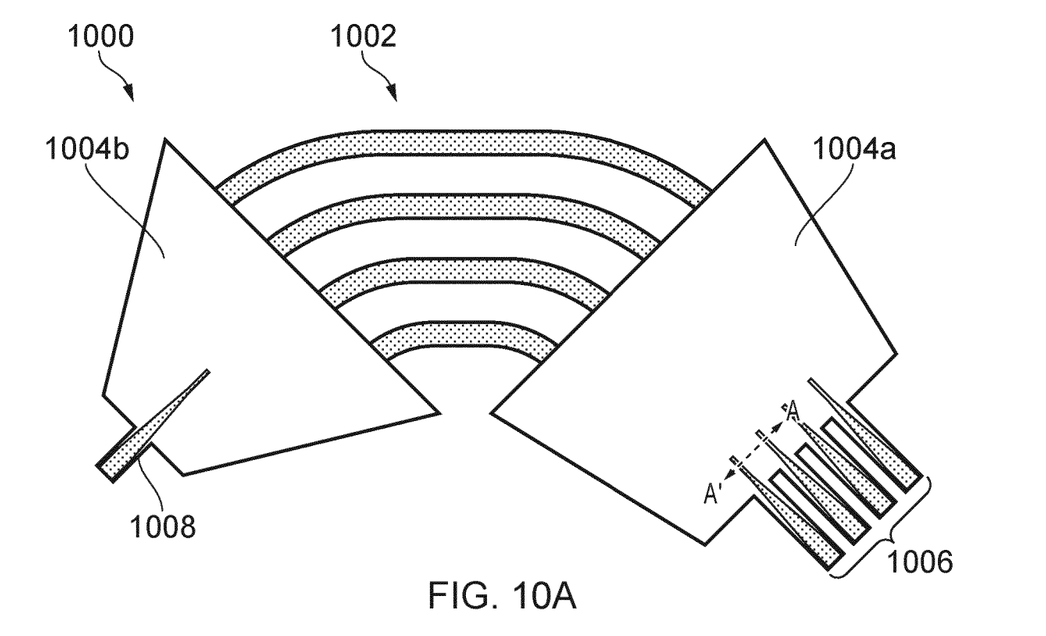
FIG. 10A shows an optical multiplexer.

FIG. 10A shows an optical multiplexer 1000 according to a variant embodiment of the present invention. The optical multiplexer 1000 includes a wavelength multiplexer element 1002 provided as an arrayed waveguide grating (AWG). The AWG 1002 is coupled, via slab waveguides 1004a and 1004b, to a plurality of input waveguides 10006 of the type shown in FIG. 5, and an output waveguide 10008, which in this example has the same geometry as the input waveguides.

Again, in use, a plurality of optical signals enter the optical multiplexer 1000 via input waveguides 1006. These signals are separated in wavelength, and are multiplexed via the arrayed waveguide grating 1002. The multiplexed signal, now comprising the combination of the separate signals, is provided through output waveguide 1008 for transmission. Of course, it will be understood that the system is symmetric and so the multiplexer may function as a demultiplexer when a multiplexed signal is coupled from the output waveguide 1008 into the slab waveguide 1004b of the wavelength multiplexer element 1002.

Figure 10B:
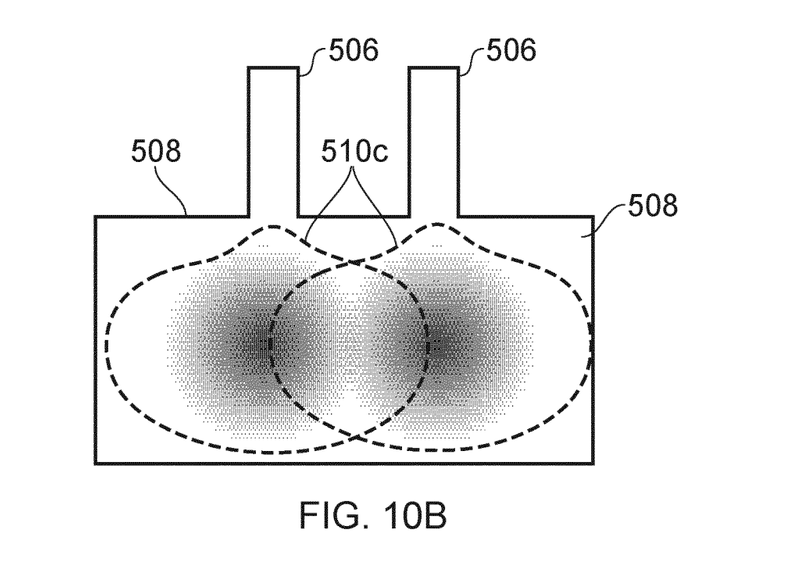
FIG. 10B shows a cross-sectional view of a portion of the optical multiplexer of FIG. 10A.

FIG. 10B shows a cross-sectional view of the optical multiplexer 1000 of FIG. 10A along the line A-A'. As can be seen, at this point the input rib portions 506 have tapered sufficiently so as to push the optical modes 510c of light contained therein substantially into the input slab portions 508. Conveniently, substantial overlap is seen between the modes due in part to the proximity of the input rib portions 506.

Figure 11A:
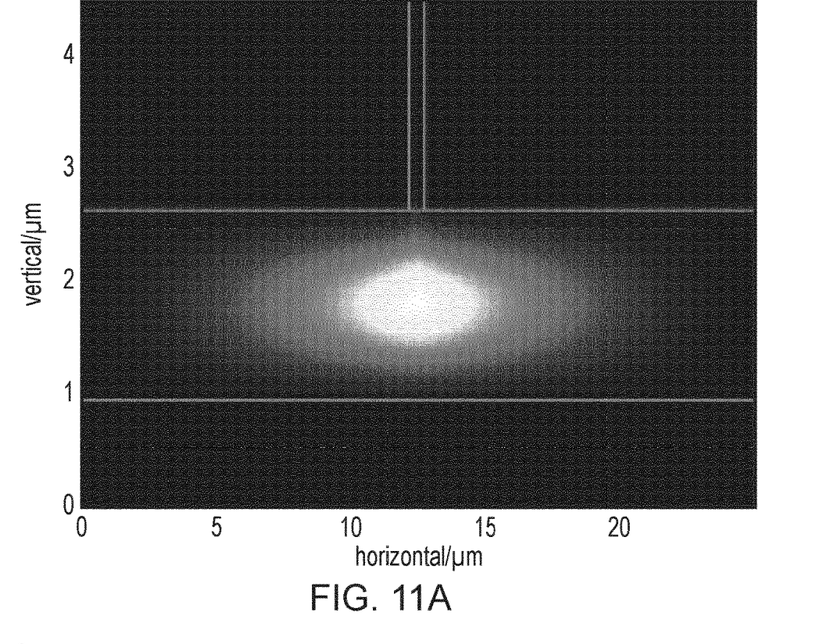
FIGS. 11A and 11B show an optical mode within a tapered waveguide input, and a corresponding wavelength against transmission plot.
Figure 11B:
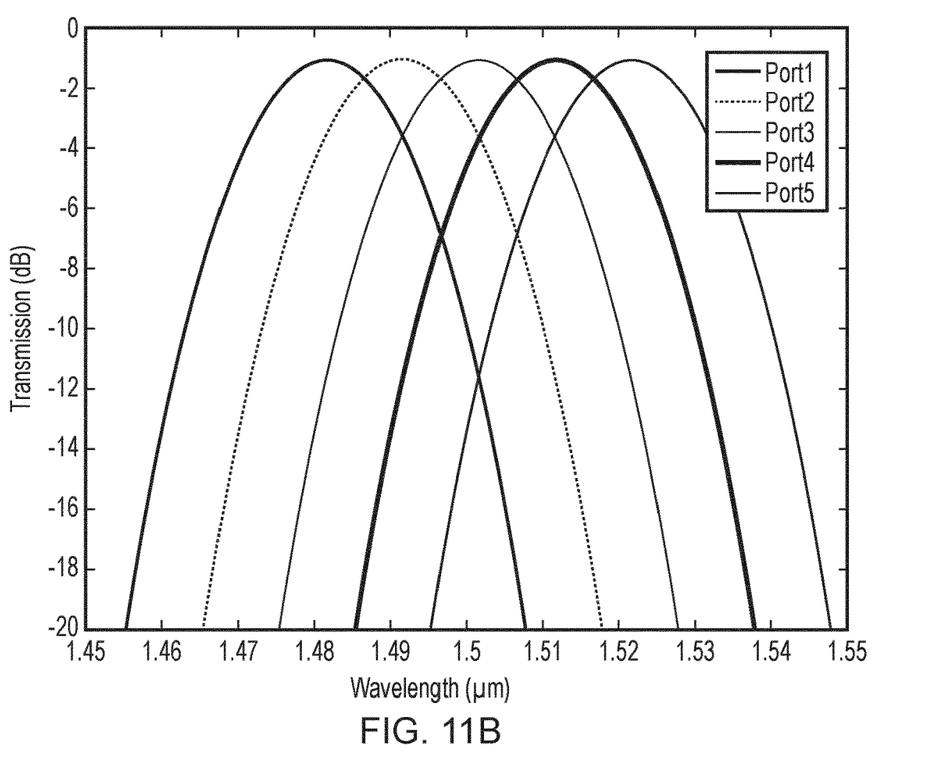
Figure 12A:
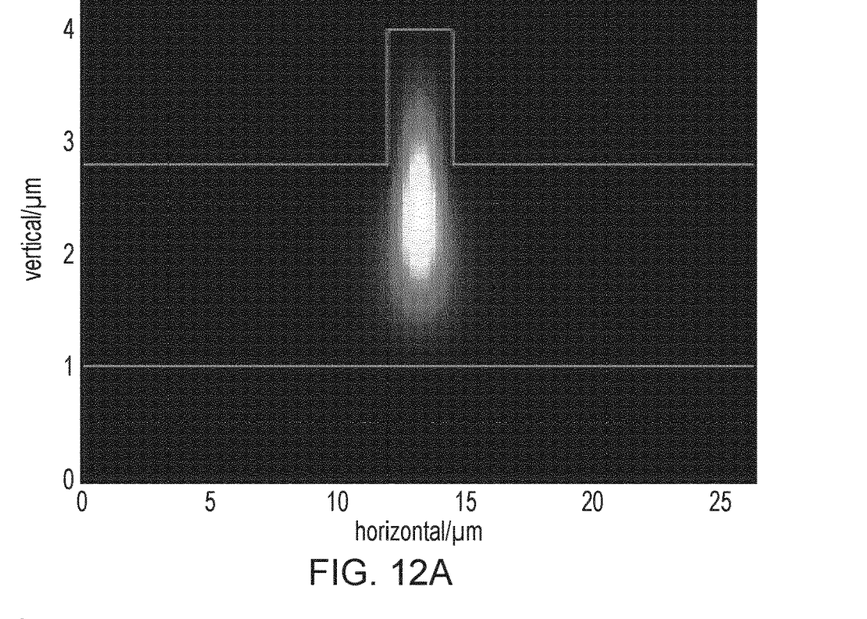
FIGS. 12A and 12B show an optical mode within a rib waveguide input, and a corresponding wavelength against transmission plot.
Figure 12B:
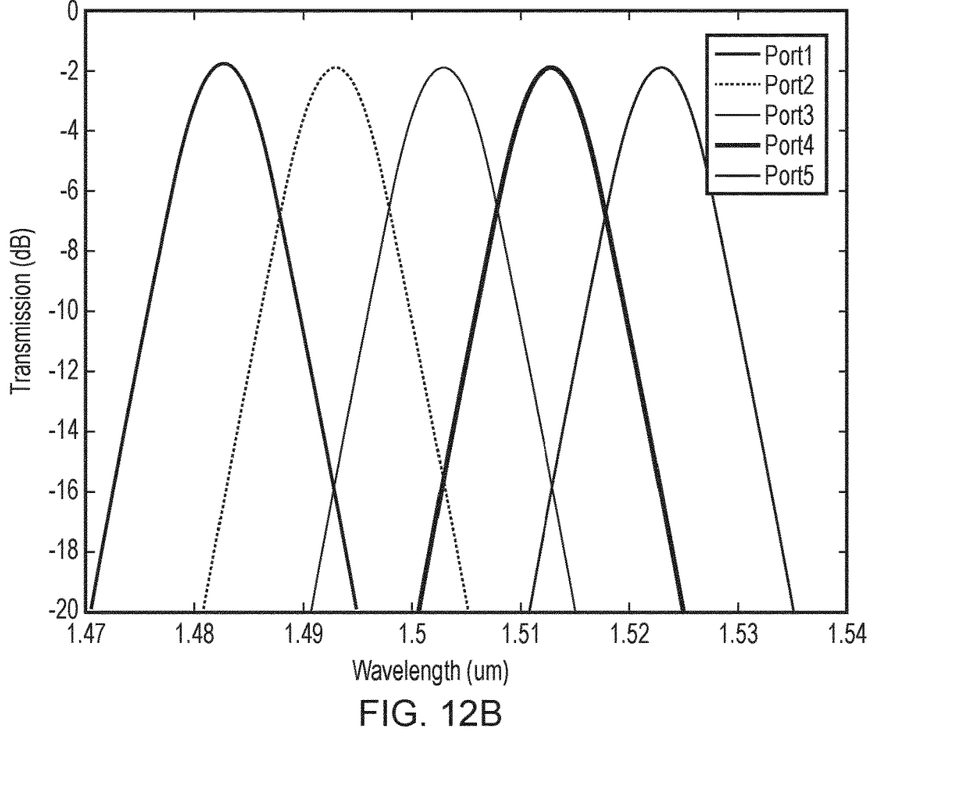
Figure 13A:
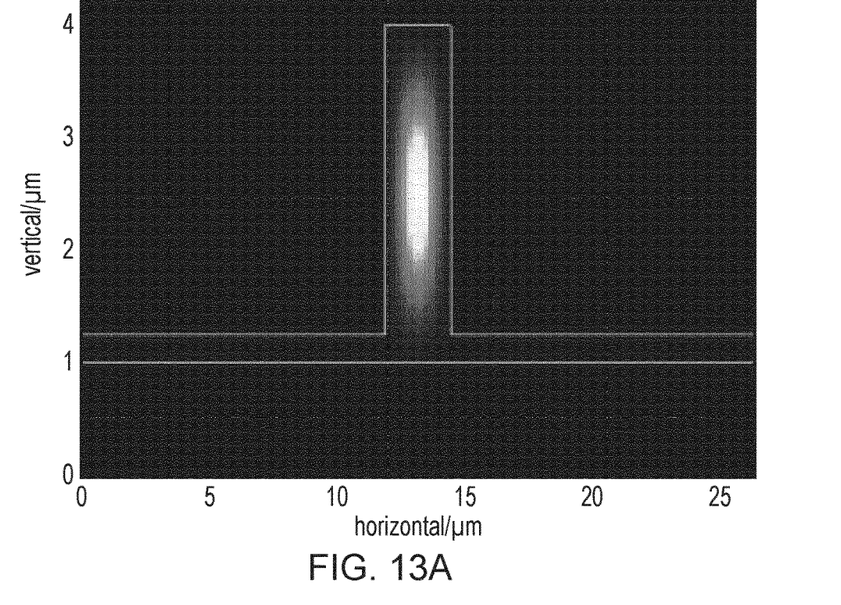
FIGS. 13A and 13B show an optical mode within a strip waveguide input, and a corresponding wavelength against transmission plot.
Figure 13B:
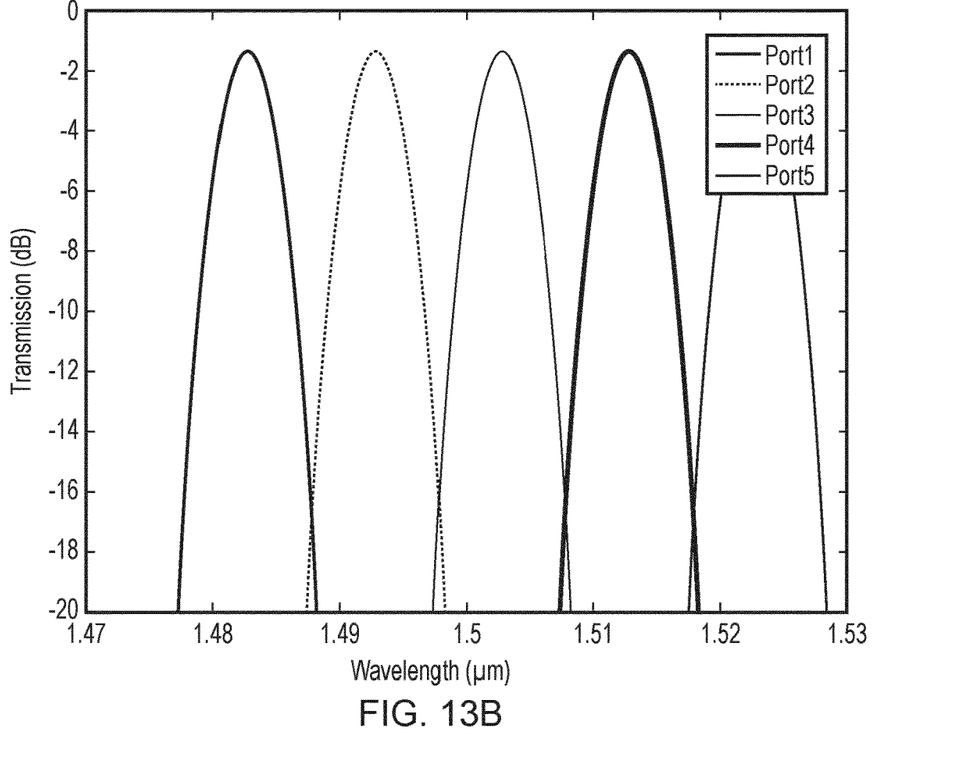

FIGS. 11A and 11B show a simulated optical mode within a tapered waveguide input, and a corresponding wavelength against transmission plot. As can be seen from FIG. 11B, a broad channel is achieved whilst retaining high transmission (around −1 dB). In contrast, FIGS. 12A and 12B show a simulated optical mode within a rib waveguide input, and a corresponding wavelength against transmission plot and FIGS. 13A and 13B show a simulated optical mode within a strip waveguide input, and a corresponding wavelength against transmission plot. The rib waveguide input also demonstrates a wider channel, but suffers from reduced transmission (around −2 dB). Whereas the strip waveguide retains the higher transmission levels (around −1 dB) but has narrower channels which do not overlap to any substantial degree.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An optical multiplexer, comprising:
a plurality of input waveguides, each comprising an input slab portion and an input rib portion;
an output waveguide, comprising an output slab portion and output rib portion; and
a wavelength multiplexer element, coupled to each input waveguide and the output waveguide, the wavelength multiplexer element comprising a slab waveguide which includes a grating configured to multiplex signals of differing wavelengths, received from the input waveguides, into a multiplexed signal, and provide the multiplexed signal to the output waveguide,
wherein the input rib portion(s) of one or more of the input waveguides are tapered so as to decrease in width in a direction towards the slab waveguide of the wavelength multiplexer element,
wherein the input slab portions of the input waveguides and/or the output slab portion of the output waveguide have a height which is substantially equal to a height of the slab waveguide in the wavelength multiplexer element, and
wherein the wavelength multiplexer element is an echelle grating multiplexer element.

2. The optical multiplexer of claim 1, wherein all of the input waveguides are tapered so as to decrease in width in a direction towards the slab waveguide of the wavelength multiplexer element.

3. The optical multiplexer of claim 1, wherein the output waveguide is tapered so as to decrease in width in a direction towards the slab waveguide of the wavelength multiplexer element.

4. The optical multiplexer of claim 1, wherein the or each input waveguide is tapered so that an optical mode within the or each input waveguide is confined to the input slab portion of that input waveguide at a point at which that input waveguide is coupled to the slab waveguide of the wavelength multiplexer element.

5. The optical multiplexer of claim 1, wherein an optical mode of each input waveguide at least partially overlaps the optical mode of the adjacent input waveguide(s).

6. The optical multiplexer of claim 1, wherein the wavelength multiplexer element is configured to perform coarse wavelength division multiplexing.

7. The optical multiplexer of claim 1, operable over a wavelength range of at least 1.2 μm.

8. An optical multiplexer, comprising:
a plurality of input waveguides, each comprising an input slab portion and an input rib portion;
an output waveguide, comprising an output slab portion and output rib portion; and
a wavelength multiplexer element, coupled to each input waveguide and the output waveguide, the wavelength multiplexer element comprising a slab waveguide which includes a grating configured to multiplex signals of differing wavelengths, received from the input waveguides, into a multiplexed signal, and provide the multiplexed signal to the output waveguide,
wherein the input rib portion(s) of one or more of the input waveguides are tapered so as to decrease in width in a direction towards the slab waveguide of the wavelength multiplexer element, and
wherein an optical mode of each input waveguide at least partially overlaps the optical mode of the adjacent input waveguide(s).

9. The optical multiplexer of claim 8, wherein the wavelength multiplexer element is an arrayed-waveguide grating.

10. An optical multiplexer, comprising:
a plurality of input waveguides, each comprising an input slab portion and an input rib portion;
an output waveguide, comprising an output slab portion and output rib portion; and
a wavelength multiplexer element, coupled to each input waveguide and the output waveguide, the wavelength multiplexer element comprising a slab waveguide which includes a grating configured to multiplex signals of differing wavelengths, received from the input waveguides, into a multiplexed signal, and provide the multiplexed signal to the output waveguide, wherein the input rib portion(s) of one or more of the input waveguides are tapered so as to decrease in width in a direction towards the slab waveguide of the wavelength multiplexer element, and wherein, for a waveguide of the plurality of input waveguides, the material of the input rib portion is continuous with the material of the input slab portion.

11. The optical multiplexer of claim 10, wherein the wavelength multiplexer element is configured to perform coarse wavelength division multiplexing.

12. The optical multiplexer of claim 10, operable over a wavelength range of at least 1.2 µm.

13. The optical multiplexer of claim 10, wherein all of the input waveguides are tapered so as to decrease in width in a direction towards the slab waveguide of the wavelength multiplexer element.

14. The optical multiplexer of claim 10, wherein the output waveguide is tapered so as to decrease in width in a direction towards the slab waveguide of the wavelength multiplexer element.

15. The optical multiplexer of claim 10, wherein the or each input waveguide is tapered so that an optical mode within the or each input waveguide is confined to the input slab portion of that input waveguide at a point at which that input waveguide is coupled to the slab waveguide of the wavelength multiplexer element.

16. The optical multiplexer of claim 10, wherein the input slab portions of the input waveguides and/or the output slab portion of the output waveguide have a height which is substantially equal to a height of the slab waveguide in the wavelength multiplexer element.

17. The optical multiplexer of claim 10, wherein the wavelength multiplexer element is an echelle grating multiplexer element.

18. The optical multiplexer of claim 10, wherein the wavelength multiplexer element is an arrayed-waveguide grating.

19. The optical multiplexer of claim 10, wherein an optical mode of each input waveguide at least partially overlaps the optical mode of the adjacent input waveguide(s).

\* \* \* \* \*